(12) United States Patent
Manning

(10) Patent No.: US 8,317,490 B2
(45) Date of Patent: Nov. 27, 2012

(54) TORQUE DRIVE MECHANISM FOR GAS COMPRESSOR

(75) Inventor: John B. Manning, Lakeland, FL (US)

(73) Assignee: LDG Enterprises, LLC, Mulberry, FL (US)

(*) Notice: Subject to any disclaimer, the term of this patent is extended or adjusted under 35 U.S.C. 154(b) by 726 days.

(21) Appl. No.: 11/371,141

(22) Filed: Mar. 8, 2006

(65) Prior Publication Data
US 2006/0239827 A1 Oct. 26, 2006

Related U.S. Application Data

(60) Provisional application No. 60/659,489, filed on Mar. 8, 2005.

(51) Int. Cl.
*F04B 17/00* (2006.01)
*F04B 35/00* (2006.01)
*H02K 7/10* (2006.01)

(52) U.S. Cl. ............... 417/323; 417/53; 310/41; 310/78

(58) Field of Classification Search .................... 417/16, 417/282, 27, 290, 295, 323, 10, 46, 47, 53; 318/461, 778, 771, 788, 430, 431; 74/450; 60/616, 788; 310/41, 75 R, 78, 92, 94; 388/903
See application file for complete search history.

(56) References Cited

U.S. PATENT DOCUMENTS

| | | | | |
|---|---|---|---|---|
| 2,115,671 A * | 4/1938 | Pfister | ........................ | 290/38 A |
| 3,067,370 A * | 12/1962 | Quittner | ........................ | 318/137 |
| 3,300,697 A | 1/1967 | Woodford | ...................... | 318/136 |
| 4,219,764 A | 8/1980 | Terada et al. | | |
| 4,699,095 A * | 10/1987 | Klie et al. | ................ | 123/179.31 |
| 4,707,644 A * | 11/1987 | Miller et al. | ................... | 318/136 |
| 4,754,606 A * | 7/1988 | Nam | ............................... | 60/616 |
| 4,875,643 A * | 10/1989 | Gietzen et al. | .............. | 244/53 A |
| 4,901,689 A | 2/1990 | Cummins et al. | | |
| 5,087,824 A * | 2/1992 | Nelson | .......................... | 290/1 A |
| 5,402,631 A * | 4/1995 | Wulf | ............................... | 60/783 |
| 5,477,115 A * | 12/1995 | McClean et al. | .............. | 318/461 |
| 5,485,719 A * | 1/1996 | Wulf | ............................... | 60/785 |
| 6,125,713 A * | 10/2000 | Langlois et al. | ................ | 74/450 |
| 6,694,934 B1* | 2/2004 | Preston et al. | ............. | 123/90.16 |
| 6,834,737 B2 | 12/2004 | Bloxham | ....................... | 180/165 |
| 7,331,271 B2* | 2/2008 | Sanderson et al. | ............. | 92/12.2 |
| 2002/0047416 A1 | 4/2002 | Oliveira et al. | | |
| 2002/0157881 A1* | 10/2002 | Bakholdin et al. | ........... | 180/65.2 |
| 2003/0052485 A1 | 3/2003 | Poteet et al. | .................. | 290/4 R |
| 2003/0060907 A1 | 3/2003 | Poteet et al. | .................... | 700/75 |

(Continued)

OTHER PUBLICATIONS

Elliott, J., "Dual Drive Compressor Uses Both Gas and Electric Power," *ComressorTech$^{Two}$* pp. 90-91 (May-Jun. 2002).

(Continued)

*Primary Examiner* — Peter J Bertheaud
(74) *Attorney, Agent, or Firm* — Burns & Levinson LLP; Bruce D. Jobse, Esq.

(57) ABSTRACT

A torque drive mechanism for a gas compressor incorporates one or more air or gas engine starters to initiate rotation of a gas compressor and its associated driving electric motor. The air or gas engine starters are advantageously driven by natural gas from a supply pipeline, where the natural gas is present at sufficient pressure to drive the starters even before the natural gas is compressed.

4 Claims, 12 Drawing Sheets

U.S. PATENT DOCUMENTS

| | | | |
|---|---|---|---|
| 2003/0205213 A1* | 11/2003 | Aquino et al. | 123/241 |
| 2004/0011523 A1* | 1/2004 | Sarada | 166/244.1 |
| 2004/0018805 A1* | 1/2004 | Pham | 451/56 |
| 2004/0098142 A1 | 5/2004 | Warren et al. | 700/22 |
| 2005/0196298 A1 | 9/2005 | Manning | 417/364 |
| 2005/0224025 A1* | 10/2005 | Sanderson | 123/48 B |
| 2006/0108463 A1* | 5/2006 | Gross et al. | 241/101.78 |

OTHER PUBLICATIONS

Elliott, J., "Dual Drive Compressor Proves Successful in Field Gathering Installation," ComressorTech$^{Two}$ pp. 34 and 36 (Jan.-Feb. 2004).

LaGrone, S. et al., "Application of a 5500 RPM High Speed Induction Motor and Drive in a 7000 HP Natural Gas Compressor Installation," *IEEE* pp. 141-146 (1992).

Ohanian, S. et al. "Series of Parallel Arrangement in a Two-Unit Compressor Station," *ASME*; vol. 124:936-941, (Oct. 2002).

Oliver, J.A. et al., "High-Speed, High-Horsepower Electric Motors for Pipeline Compressors: Available ASD Technology, Reliability, Harmonic Control," *IEEE* Transactions on Energy Conversion vol. 10, No. 3 pp. 470-476 (Sep. 1995).

Oliver, J.A. et al., "Electrification of Natural Gas Pipeline—A Great Opportunity for Two Capital Intensive Industries," *IEEE* Transactions on Energy Conversion vol. 14, No. 4 pp. 1502-1506 (Dec. 1999).

Rama, John C. et al., "High Speed Electric Drive Applications, Experience, Potential & Pitfalls—A Global Overview," *IEEE* Paper No. PCIC-95-18, pp. 167-174 (1995).

Sabella, D. et al., "Full-Load String Test Meets Stringent Goals for LNG Project Compressor," *Oil & Gas Journal*, pp. 62-67 (Nov. 2002).

Wrenn, Jr., K. Frederick, "Electric Powered Compression: A Viable Approach for Meeting New Pipelines," *Pipeline & Gas Journal*, pp. 60-66 (Oct. 2000).

"Electrification of Gas Pipeline and Storage Compressors: Strategic Load Growth and Business Development Opportunities," *EPRI* PO-113349 (Jun. 1999).

Product Report, "Diesel & Gas Publication," Oct. 1993.

"Variable Speed Drives for Large Turbomachines," *Siemens*, pp. 1-24 (2002).

Notice of Allowance, Notice of Allowability and Detailed Action dated Sep. 10, 2009 from U.S. Appl. No. 11/370,291, filed Mar. 8, 2006. Applicant: John B. Manning.

Non-final Office Action dated Dec. 2, 2008 for U.S. Appl. No. 11/370,291, filed Mar. 8, 2006. Applicant: John B. Manning.

Response dated Jun. 2, 2009 to non-final Office Action dated Dec. 2, 2008 for U.S. Appl. No. 11/370,291, filed Mar. 8, 2006. Applicant: John B. Manning.

\* cited by examiner

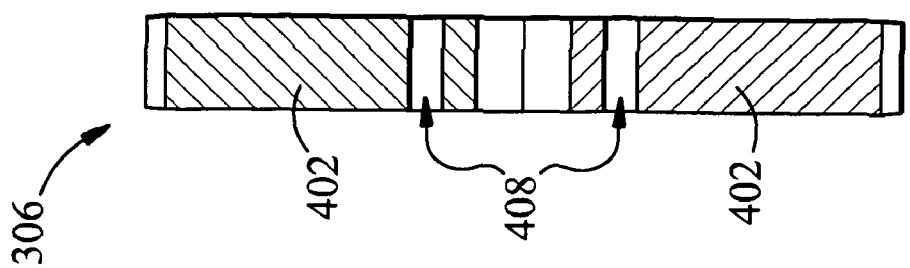
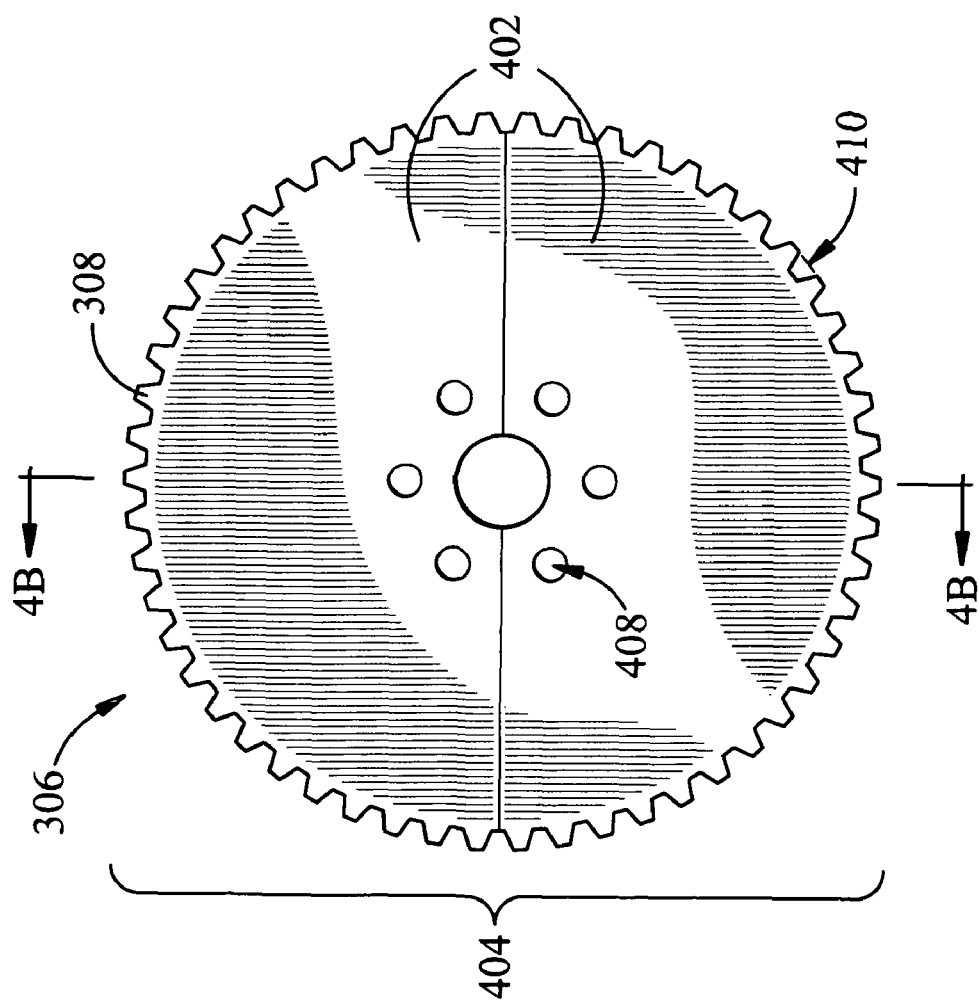

TORQUE DRIVE MECHANISM FOR GAS COMPRESSOR

CROSS REFERENCE TO RELATED APPLICATIONS

This application claims priority from U.S. Provisional Application 60/659,489, filed Mar. 8, 2005 and incorporated herein by reference in its entirety.

FIELD OF THE INVENTION

The invention relates to gas compression, and, more particularly, to an apparatus and method for starting up a gas compressor driven by an electric motor.

BACKGROUND OF THE INVENTION

In the natural gas gathering industry, there have been two basic gas compressor units available in the 1000 to 6000 hp range. One is an electric driven gas compressor and the other is a reciprocating engine driven gas compressor. Electric driven gas compressors in this class range have been predominantly utilized in the offshore drilling industry and, in isolated cases, for land side use.

An electric driven gas compressor offers more favorable maintenance features. However certain issues regarding the cost of electricity and related issues regarding necessary amount of reserve capacity or standby available power required to start an electric motor have prevented electric driven gas compressors from being more widely utilized.

Most electric utilities in the US consider the availability of extra capacity when establishing an electricity rate to large industrial users of electricity. Large industrial users are often assessed penalties in the form of higher electricity prices for peak electricity demands exceeding base load requirements, especially when the industrial user requires instantaneous and short spikes, as for example, when starting an electric motor. Starting an electric motor may require up to a 650 percent increase in the normal operating demand for current by the electric motor. Since this current demand requires the utility to have the extra capacity in reserve, this reserve or peak load demand is more expensive to provide. In most cases, the extra cost of the electric current makes use of electric motor driven gas compressors less feasible than running the gas compressor on a reciprocating gas engine.

Consequently, reciprocating gas engine-driven compressors are used in the majority of gas compressor stations. A portion of the natural gas forwarded at the gas compression station is utilized to operate the natural gas fired engines which drive the gas compressors. Due the higher cost of a lower rpm reciprocating gas fired engine, most gas compressor units utilize high rpm reciprocating gas engines in the compressor packages. Operations and maintenance cost of the reciprocating gas engine is usually high and constitutes a large portion of the cost of operating a gas compressor. Unscheduled down time due to unexpected engine failures are a common complaint. Major overhauls of the engine are costly and are frequently required.

An electric motor driven compressor, requires much less maintenance and provides increased run time over reciprocating gas engine driven compressors, and would be even more feasible if the price of electricity were lower.

SUMMARY OF THE INVENTION

The needs of the invention set forth above as well as further and other needs and advantages of the present invention are achieved by the embodiments of the invention described herein below.

According to one aspect of the invention, a system for compression of gas includes a single shaft electric motor with a single motor shaft, a compressor with a compressor shaft, a coupler with a first end coupled to the single motor shaft and a second end coupled to the compressor shaft, a gear coupled to the coupler, and at least one starter selectively disengagably coupled to the gear.

In one embodiment of the invention, the gear may be coupled to the first end of the coupler and in another embodiment, to the second end of the coupler. In a certain embodiment, the gear may include a flywheel with teeth at a periphery of the flywheel. In certain embodiments, the gear may include a flywheel further including a plurality of sections, each coupled the coupler. Each section may include one or more removable sections having teeth-like elements. The flywheel may also include a dished section coupled to the coupler. In additional embodiments of the invention, the system may include a plurality of starters capable of being selectively disengagably coupled to the gear.

In other embodiments of the invention, the at least one starter includes a first end having a first end starter shaft and a second end having a second end starter shaft. The first end starter shaft may include a first gear and a second gear and second end starter shaft may include a gear and a turbine. The first gear of the first end starter shaft may be capable of coupling to the gear coupled to the coupler and the second gear of the first end starter shaft may be capable of coupling to the gear of the second end starter shaft. The at least one starter may be coupled to a source of pressurized fluid, which may be a compressed gas such as compressed natural gas. The source of compressed natural gas may be a pipeline containing the compressed natural gas.

In still other embodiments of the invention, the system may further include a first regulator, connected to a source of pressurized fluid and to the first end of the at least one starter and operably connected to a switch for activating the compressor, and to a second regulator, operably connected to the first end of the at least one starter and connected to the second end of the at least one starter and to the source of pressurized fluid. The system may also include a detector of a rotational speed, possibly optical or a magnetic, of the single motor shaft and a controller coupled to the detector of the rotational speed of the single motor shaft and to the switch.

According to another aspect of the invention, a method for retrofitting a single shaft electric motor coupled to a compressor with a coupler includes mounting a gear on the coupler and mounting a starter selectively engagably coupled to the gear. In some embodiments of the invention, the method may include operably connecting a regulator to a switch and connecting the regulator to a source of pressurized fluid and to the starter. In other embodiments, the method may include operably connecting another regulator to the starter and connecting the another regulator to a source of pressurized fluid and to the starter.

According to an additional aspect of the invention, a method for starting an electric motor includes engaging a gear coupled to a starter with a gear coupled to a shaft of the electric motor, furnishing power to the starter so as to rotate the starter gear; disengaging the starter gear from the electric motor shaft gear at a disengaging rotational speed of the electric motor shaft gear, removing the power from the starter, furnishing electric current to the electric motor, and applying a full load to the electric motor when a rotational speed of the electric motor shaft gear is an unloaded rotational speed, where the disengaging rotational speed of the electric motor shaft gear is less than the unloaded rotational speed.

In certain embodiments of the invention, the disengaging rotational speed of the electric motor shaft gear may be less than substantially 70% of the unloaded rotational speed of the electric motor shaft gear. In other embodiments, applying full load includes supplying gas to a gas compressor coupled to the electric motor.

According to a further aspect of the invention, a retrofit kit for an electric motor includes a coupler having a gear and an end for coupling to a shaft of the electric motor; and a starter capable of being selectively disengagably coupled to the gear.

In some embodiments of the invention, the retrofit kit further includes a bracket capable of coupling to the starter. In other embodiments the gear may be integral with the coupler and may include a flywheel with teeth-like elements at the periphery of the flywheel. The flywheel may include one or more removable sections, which include the teeth-like elements.

For a better understanding of the present invention, together with other and further aspects thereof, reference is made to the accompanying drawings and detailed description and its scope will be pointed out in the appended claims.

BRIEF DESCRIPTION OF THE FIGURES

For a better understanding of the present invention, reference is made to the figures, in which:

FIG. 4A represents a front view and FIG. 4B represents a cross-sectional view taken along line 4B-4B of FIG. 4A of an embodiment of the present invention including a ring gear;

DETAILED DESCRIPTION

Figure 1:
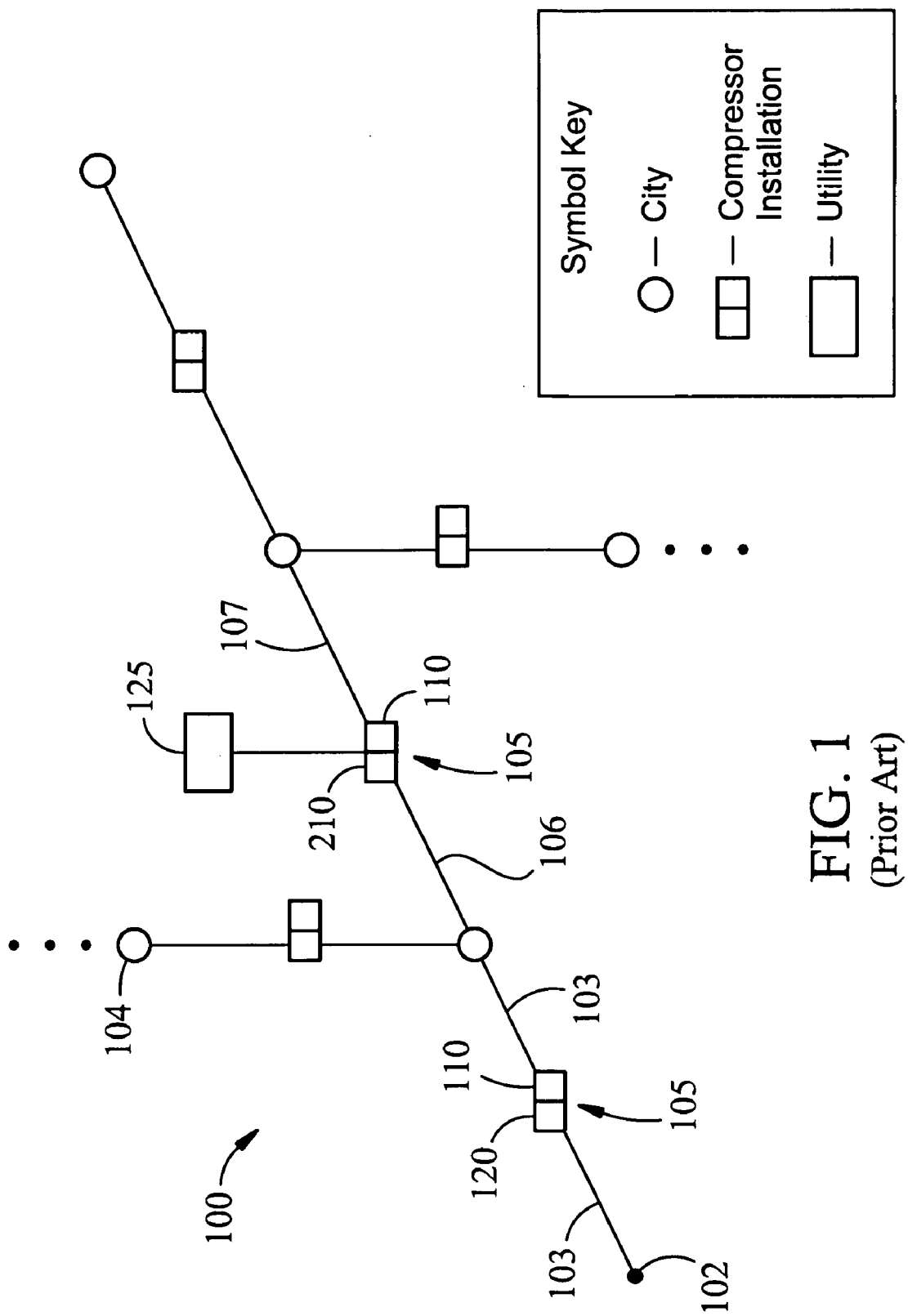
FIG. 1 is a representation of a prior art current natural gas transmission system.

FIG. 1 illustrates a representation of a current natural gas transmission system 100. Natural gas generated at a gas well 102 flows through pipelines 103 to different locations of consumption, such as cities 104, along the pipeline 103. At different locations between consumption locations or between the gas well 102 and a location are compressor installations 105. The compressor installations 105 increase the gas pressure within the gas pipeline 103 to compensate for losses due to transmission of the gas. A compressor installation 105 usually includes a compressor 110 driven by an engine 120. The engine might be a reciprocating engine 120 fired by natural gas taken from the pipeline 103 or it might be an electrical motor 210 driven by electrical power provided by a nearby utility 125.

Figure 2:
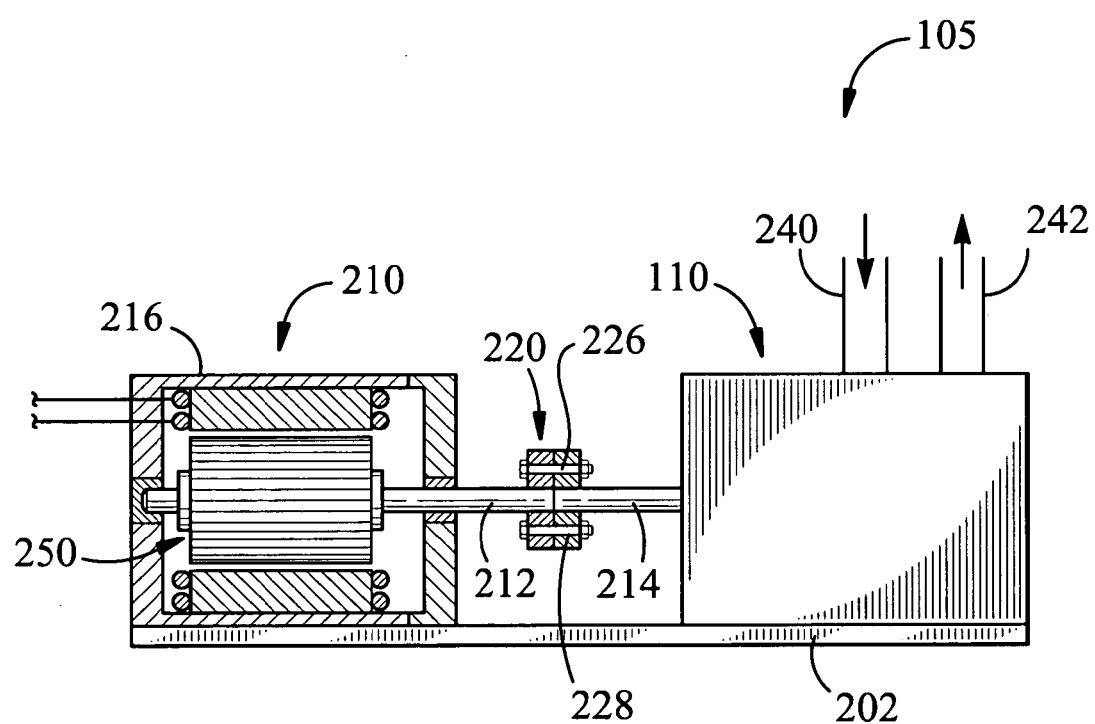
FIG. 2 is a schematic illustration of a prior art gas compression installation including a electric motor-driven gas compressor.

FIG. 2 shows a prior art gas compressor installation 105 driven by an electric motor 210. On a platform 202 are mounted the electric motor 210 and a compressor 110. As illustrated, the electric motor drive shaft 212 and the compressor drive shaft 214 share the same centerline. The electric motor 210 is of a single-shaft variety where only one end of an electric motor drive shaft 212 protrudes from the electric motor housing 216. The electric motor drive shaft 212 is coupled to the compressor drive shaft 214 by a coupler 220, for example, a tortional coupling. The coupler 220, for example, may be made of two portions. One portion or end 222 is heat-shrunk onto the electric motor drive shaft 212 and the other 224 is heat-shrunk onto the compressor drive shaft 214. During assembly, the two portions of the coupler are bolted together by several bolts 226.

Figure 3:
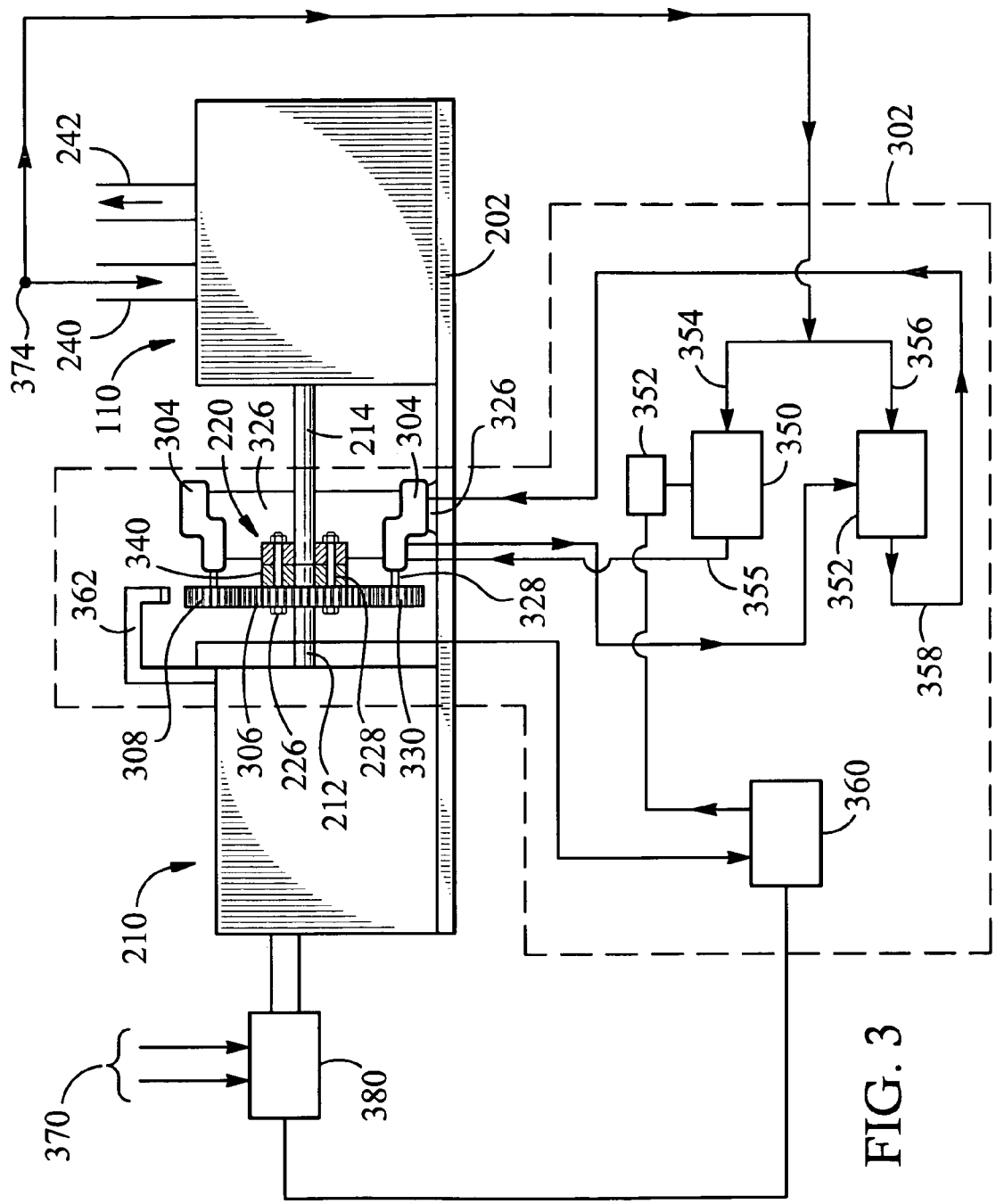
FIG. 3 is a schematic illustration of an embodiment of the present invention including a torque drive mechanism coupled to an electric motor-gas compressor installation.

FIG. 3 shows an embodiment of the invention for providing compressed natural gas. A torque drive mechanism 302, including an air or gas engine starter 304 or a plurality of starters, of the type typically used to start engines, is used to bring the drive shafts of a gas compressor 214 and an electric motor 212, which ultimately drives the compressor 110, from rest up to approximately 70% of the rated operational rotational speed of the electric motor 210 prior to applying electricity to the electric motor 210, where the rated operational rotational speed of the electric motor 210 is the operating speed at which the electric motor 210 is designed to operate in steady state. An example of a starter to which the starters of the invention are similar (but sized according to anticipated loading) is an Ingersoll-Rand Model 150 BMPDRH starter or a TDI 12-2004-002 starter.

As a result of inclusion of an embodiment such as a torque drive mechanism embodiment 302, the need for reserve electric capacity normally required to start an electric motor 210 and made available by the utility or power system 125, is reduced or eliminated, and the amount of electric power that the utility 125 must reserve in the form of "extra capacity" is reduced. In turn, the amount charged by the utility 125 to provide the power needed to operate a particular electric motor 210 may be reduced.

The electric motor drive shaft 212 and compressor drive shaft 214 may be coupled together with a coupler 220, for example, a torsional coupling. A gear, for example, a ring gear 304, having serrations or teeth 308 may be attached to a torsional coupling 220, e.g., by a forging method or by utilizing a number of bolts 226 on the coupling 220. If needed, additional bolts holes 228 may be drilled and tapped in the coupling 220 to mate with the bolt hole pattern in the serrated ring gear 306. A coupling 220 may also be provided that is already equipped with a ring gear 306.

FIGS. 4A and 4B show an embodiment of the ring gear 306. The ring gear 306 comprises a plurality of sections 402 that together form a disc 404. In FIG. 4, there are two sections 402, each comprising a semicircle. Holes 408 near the center match those holes 228 in the coupler 220 already attached to the electric motor shaft 212. The sections 402 allow installation of the ring gear 306 to an already assembled electric motor compressor installation 105 and may also be installed on a coupler 220 attached to a compressor shaft 214.

Figure 5B:
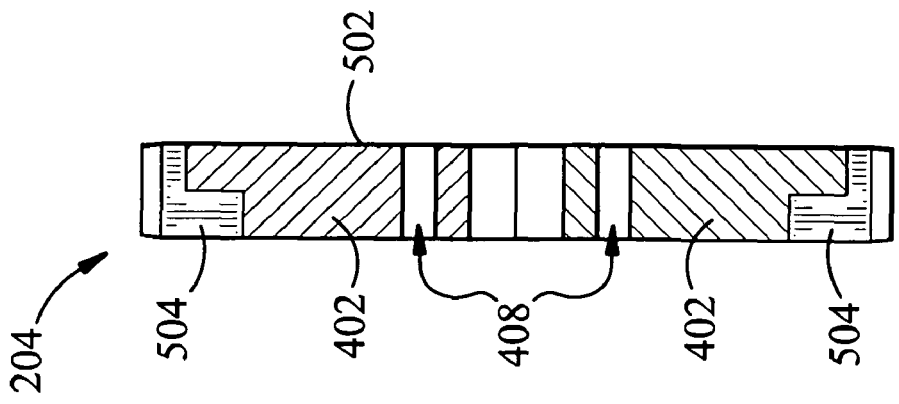
FIG. 5A represents a front view and FIG. 5B represents a cross-sectional view taken along line 5B-5B of FIG. 5A of an embodiment of the present invention including a ring gear containing a flywheel and removable peripheral sections.
Figure 5A:
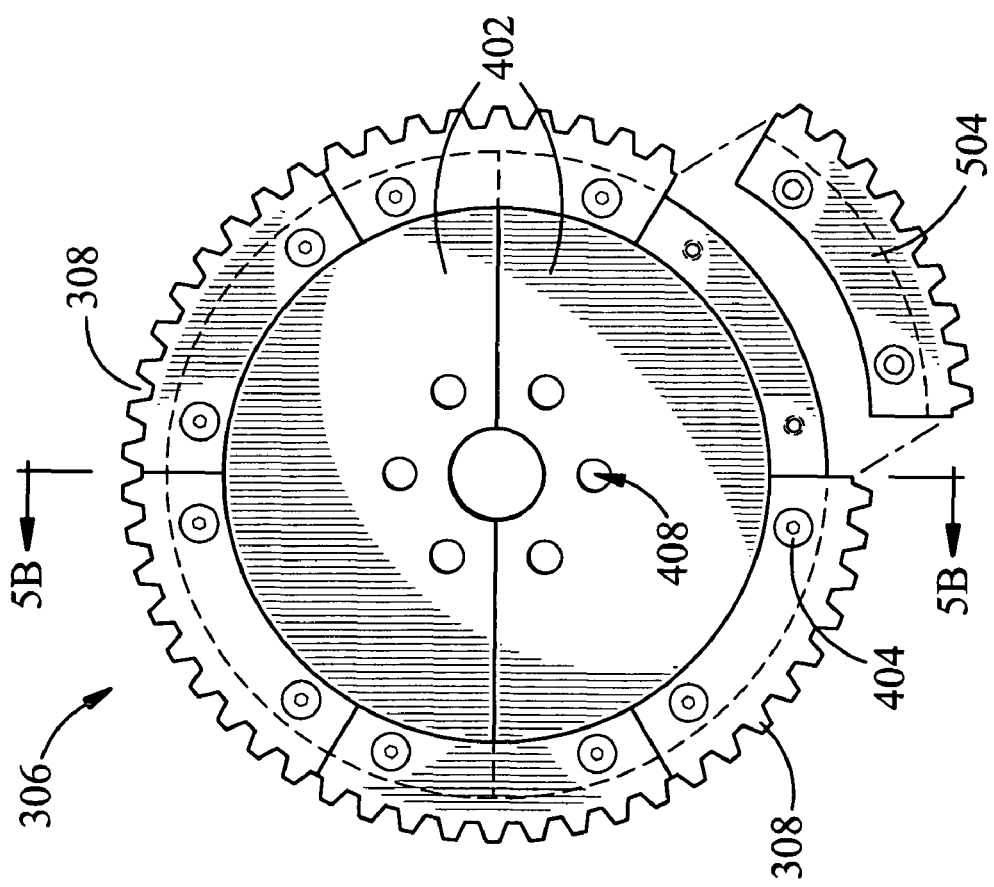

FIGS. 5A and 5B illustrate a ring gear comprising a flywheel 502 and removable peripheral sections 504. The removable peripheral sections 504 containing the teeth or serrations 308 of the ring gear 306 are mounted at the periphery 506 of the flywheel 502. In operation, should any of the teeth 308 become damaged, the removable peripheral section 504 containing the damaged teeth 308 may be removed and replaced without having to remove the entire ring gear 306.

Figure 6A:
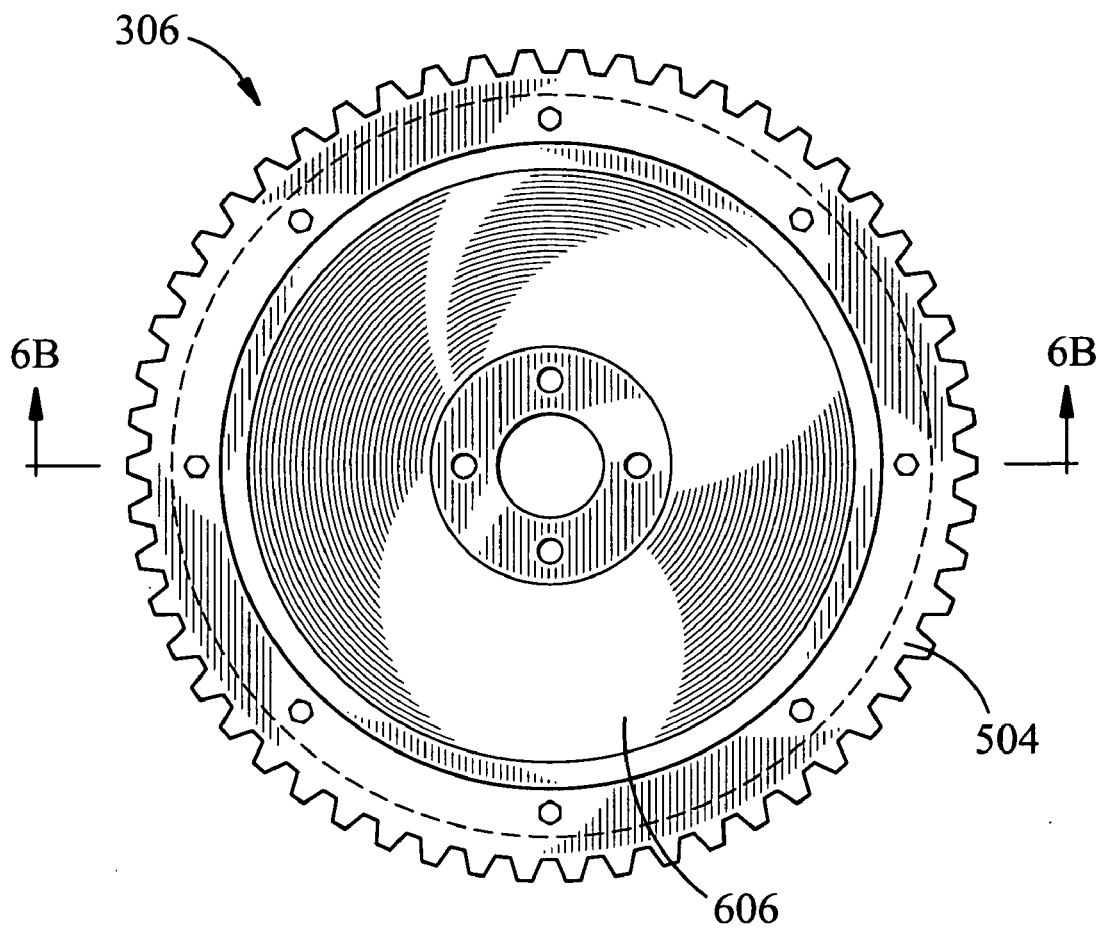
FIG. 6A represents a front view and FIG. 6B represents a cross-sectional view taken along line 6B-6B of FIG. 6A of an embodiment of the present invention including a ring gear containing a flywheel where the flywheel includes a dish section.
Figure 6B:
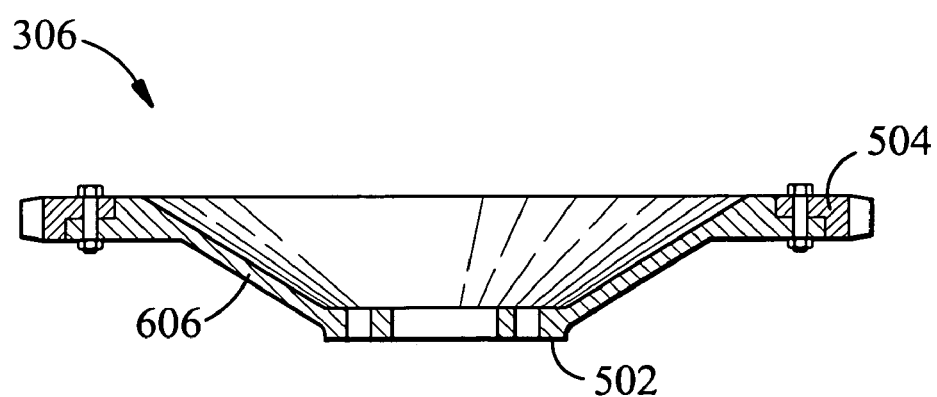

FIGS. 6A and 6B illustrate a ring gear 306 having a flywheel 502 with removable peripheral sections 504 where, in addition, an interior dish section 606 of the flywheel 502 are depressed relative to the level of the peripheral section 504 containing the teeth 308 to allow clearance so that the teeth 308 become more accessible in terms of being engaged.

The embodiments of the invention shown in FIG. 3, as including a torque drive mechanism 302, includes a support or supports 326 mounted on the platform 202. One or, more preferably and as shown in FIG. 3, a plurality of air or gas engine starters 304 may be mounted on the support or supports 326, for example, a steel bracket or brackets, which allows each starter 304 to be placed in such a position as to allow a pre-engaging bendix 328 of each starter 304 to pre-engage the serrations or teeth 308 of the ring gear 306 before application of rotational power. When the starter 304 is activated, the starter gear 330 engages the serrations or teeth 308 on the ring gear 306. Rotation of the starter gear 330 thus acts to rotate the ring gear 306 and, consequently, the electric motor drive shaft 212 and the compressor drive shaft 214.

Figure 7:
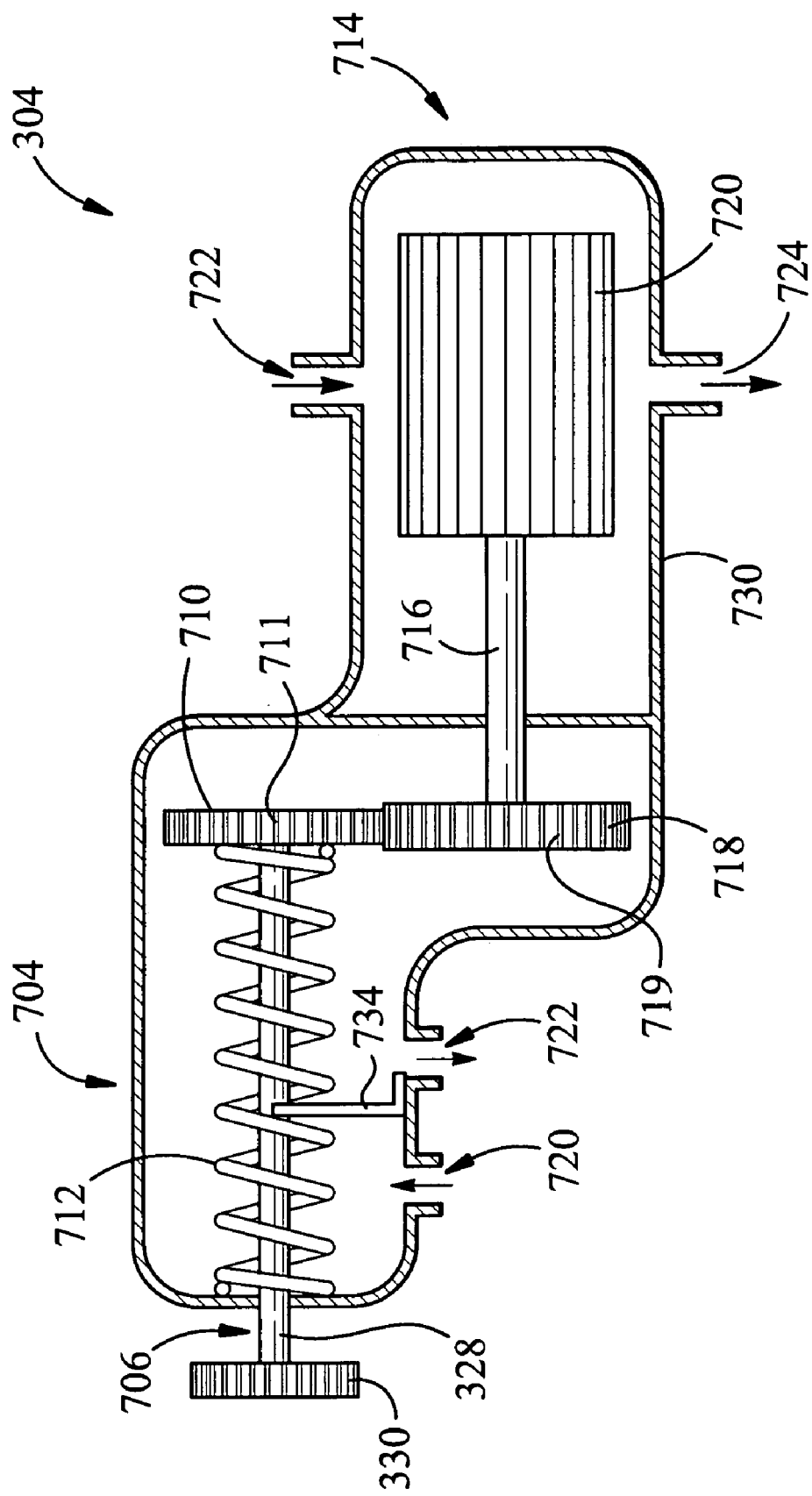
FIG. 7 is a schematic cross-sectional illustration of a prior art air or gas engine starter.

FIG. 7 contains a cross-sectional schematic illustration of a prior art air or gas engine starter 304 as employed in rotating the ring gear 306 and, consequently, the compressor drive shaft 214 and electric motor drive shaft 212 of the present invention which together of other components of the present invention are clearly shown in FIG. 3. The air or gas engine starter 304 has two ends, a driven end 714 and a driving end 704. The driving end 704 contains the bendix 328. More specifically, the driving end 704 of the air or gas engine starter 304 contains a driving end shaft or driving shaft 706 which has a driving gear or starter gear 330 at one end and a driven gear 710 at its other end. The driving gear 330 is designed to engage the teeth or serrations 308 at the periphery 410 of the ring gear 308. The driving shaft 706 may move back and forth, in and out, in a direction parallel to the driving shaft 706. A spring or retracting spring 712 surrounding the driving end shaft 706 provides a restoring force to the driving shaft 706. The driving end 704 is sealed from the driven end 714 and contains an inlet 720 and an outlet 722.

When the embodiment of the invention includes a plurality of air or gas engine starters 304, the driving gears 330 of the driving shafts 706 of the air or gas driven starters 304 may form the same or different gear ratios with the serrations 308 at the periphery 410 of the ring gear 306. As a result, different amounts of torque may be furnished to the electric motor 212 and compressor drive shafts 214 by selectively activating different combinations of the air or gas engine starters 304. An system including a plurality of starters 304 allows the system to meet low rotational speed torque requirements and high rotational speed requirements.

Offset and below is the driven end 714 of the starter 304. The driven end 714 contains a driven end shaft or driven shaft 716. At one end of the driven shaft 716 is a driving gear 718. The teeth 719 of the driving gear 718 of the driven shaft 716 may engage the teeth 711 of the driven gear 710 of the driving shaft 706. At the other end of the driven end shaft is a turbine 720. Compressed gas entering the driven end at an inlet 722 rotates the turbine 720. The spent gas exits at an outlet 724 from the driven end 714.

Although compressed air is often used to drive such starters 304, in embodiments of the invention, natural gas is used. Even before being compressed by the compressor 110, natural gas within the natural gas supply pipeline 103 feeding the compressor 110 may have a pressure of about 300 PSI. (Compression by the compressor 110 typically raises the pressure of the natural gas at the outlet 242 of the compressor 110 to about 1000 PSI.) The lower-pressure natural gas at the inlet 240 to the compressor 110 may be used to drive the air or gas engine starter 304 so as to bring the gas compressor 110 and its driving electric motor 210 up to operational rotational speed.

The pre-engaging bendix 328 of each starter 304 engages the teeth 308 of the ring gear 306, mounted onto a flange 340 of a standard coupling or tortional coupling 220 used to connect the drive shafts of the electric motor 212 and the gas compressor 214. Pressurized air or gas provides the impetus for the bendix 328 of the air or gas engine starter 304 to engage the teeth 308 of the ring gear 306. Upon engagement, additional air or gas supplied to the air or gas engine starter 304 provides the impetus to rotate the bendix 328. Rotation of the bendix 328 or driving shaft 706, in turn, rotates the coupling 220 and other components attached to the coupling, including the electric motor 212 and the gas compressor drive shafts 214.

According to the embodiment illustrated in FIG. 3, the air or gas starter or starters 304 is connected by flex pipe to a manifold pipe assembly (not illustrated) that includes a series of air or gas electronically actuated valves 350. The manifold may be installed in a steel bracket and skid-mounted. An electronically actuated valve 350 in the manifold assembly receives a signal from a start button or switch 352 and, when activated, allows pressurized natural gas in the piping to flow though an air start manifold and through the flex pipe to pre-engage the bendix 328 of the air or gas engine starter 304. Once the bendix 328 of the air or gas engine starter 304 is fully extended and engaged in the teeth 308 of the ring gear 306, the engaged and fully extended shaft 706 of the bendix 328 exposes an air port channel opening or outlet 722 by displacement of cover 734 in the driving end 704 of the housing 730 of the air or gas engine starter 304, which forwards pressurized gas to an air or gas-actuated valve 352 in the air start manifold assembly, thus allowing the full design volume of pressurized gas within the pipeline 103 to flow to the air or gas engine starter 304 through the inlet 722 in the driven end 714 of the air or gas engine starter 304. This causes the ring gear 306, electric motor shaft 212, and unloaded gas compressor shaft 214 to begin to rotate.

Depending upon the size of the compressor-electric motor installation 105, the air or gas engine starter 304 may be sized to be able to rotate the electric motor and compressor shaft assembly 360 at a maximum rotational speed of not more than substantially 70% of the rated operating rotational speed of an operating compressor 110 or of the electric motor 210 driving the compressor 110 when the compressor 110 is completely unloaded, that is, with the compressor 110 disconnected from a source of gas. Because the compressor 214 and electric motor drive shafts 212 are rotating before the electric motor 210 is energized, the normal amount of standby electric capacity consumed in starting an electric motor-driven compressor 110 to rotate from a stopped position is no longer necessary.

Figure 8:
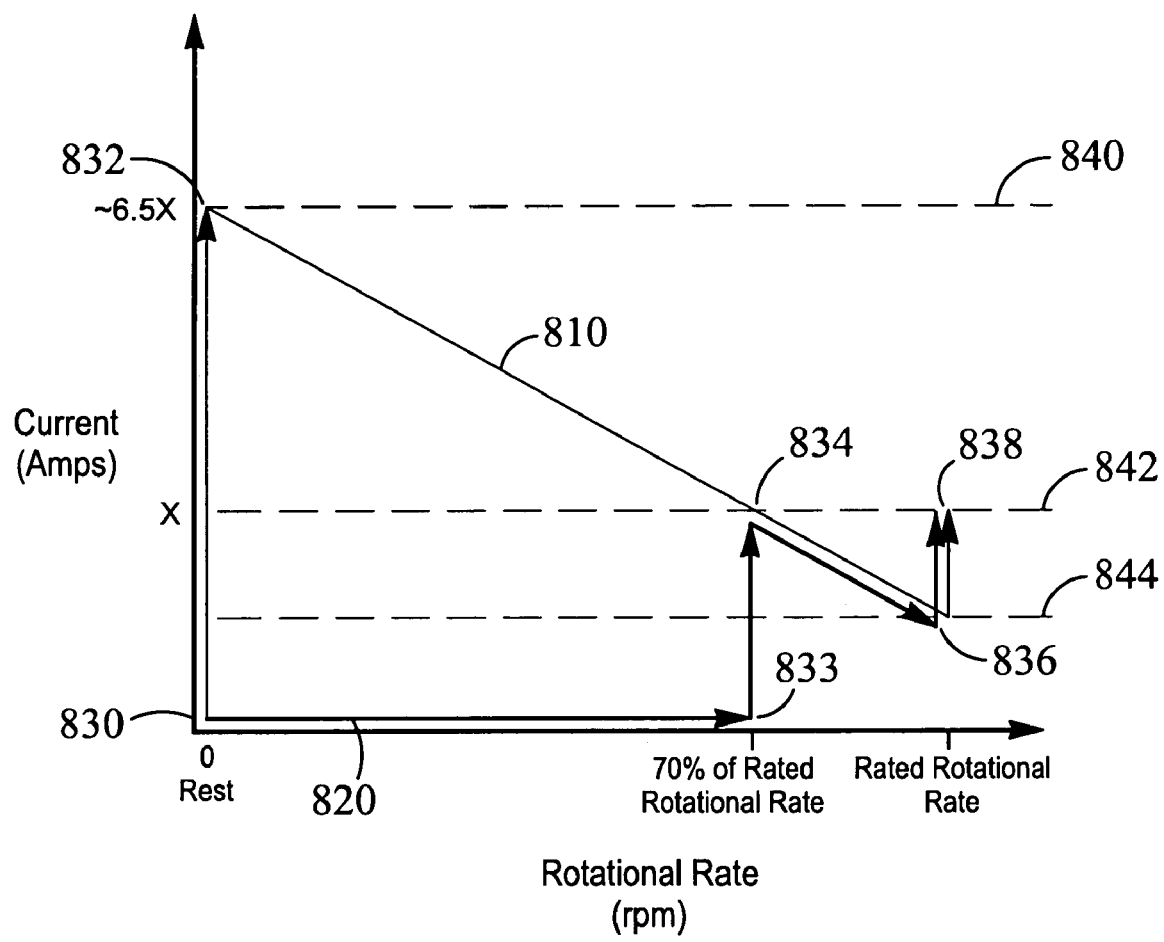
FIG. 8 contains representative plots of current drawn by an electric motor during starting as a function of electric motor shaft rotational speed with and without attachment of an embodiment of the present invention.

FIG. 8 includes a pair of curves illustrating the sequence of events associated with bringing an electric motor-compressor installation 105 from rest up to full load operation. Events are labeled by their respective rotational rates and currents drawn by the electric motor 210. Curve 810 illustrates performance of a conventional electric motor-gas compressor combination 105. In starting from rest without load (State 830), that is, no gas supplied to the compressor 110, the current drawn by the electric motor 210 increases markedly until the rotor or armature 250 of the electric motor 210 begins to rotate (State 832). This peak current, called the lock rotor current 840, reflects the inertia, and, to some extent, the friction of the rotor 250, which must be overcome to initiate rotation. Once rotation begins, the current drawn by the electric motor 210 decreases, as the rotor 250 speeds up, falling below the full load current (842 for State 834) to the no load current (844 for State 836), where gas is still not connected to the compressor 110. Finally, as gas is furnished to the compressor 110 (beginning at State 836), the current increases to the full load current (State 838) while the rotational speed remains at the rated speed. Of note, the lock rotor current 840 is several times the full load current 842, in some cases, in excess of a factor of six times.

Curve 820 illustrates the sequence events of starting an electric motor-compressor combination 105 according to embodiments of the present invention under otherwise similar conditions as applied to curve 810. In this case, the electric current drawn by the electric motor 210 starts at zero (State 830) and remains at zero as the rotor 250 is started from rest in an unloaded condition by the air or gas engine starter 304. When the speed of rotation reaches approximately 70% of the rated rotational speed of the electric motor 210, still unloaded, (State 833), the air or gas engine starter 304 is disengaged from the electric motor 210 and current is supplied to the electric motor 210. The rotational speed remains at about 70% of the rated rotational speed of the electric motor and the current increases to the full load current 842 as the electric motor 210 takes over rotation from the air or gas engine starter 304 (State 834). From this point, the sequence of states is the same as before. The rotational rate of the electric motor 210 increases to the rated rotational rate as the current decreases to the no load current (State 836). At this point, the electric motor-compressor combination 105 is gradually loaded by allowing gas to flow through the compressor 110. The current increases to the full load current 842 as the rotational speed remains at the rated rotational speed (State 838).

Thus, by use of embodiments of the present invention, the maximum current drawn by electric motor 210 during bringing an electric motor-compressor operation 105 up to full load is approximately the full load current 842, not the several times larger lock rotor current 840 as would be the case otherwise.

Stated more succinctly, with respect to the present invention as shown in FIG. 3, as the air or gas engine starter 304 rotates the electric motor 212 and compressor drive shafts 214, an electronic motor control device or controller 360, monitors the rotational speed of the electric motor shaft 212 with the speed detector 362. When the rotational speed of the electric motor shaft 212 reaches substantially 70% of the rated rotational speed of the electric motor 210, the controller 360 causes the air or gas starter bendix 328 to disengage from the ring gear 306 mounted on the coupling 220 and energizes or provides electric power and current to the electric motor 210 sufficient to rotate the compressor drive shaft 214 at a rotational speed substantially equal to the rotational speed at which the air or gas engine starter 304 rotated the compressor drive shaft 214, that is, in this case, 70% of the rated rotational speed of electric motor 210. At this point, the electric motor 210 is solely responsible for rotating the compressor drive shaft 214.

The rotational rate of the electric motor shaft 212 and the compressor drive shaft 214 continues to increase under control of controller 360. Once the rotational rate reaches the rated rotational rate or speed, the automation control device or controller 360 determines that the compressor 110 may be loaded, and loading of the compressor 110 begins, where natural gas is supplied to the inlet 240 of the gas compressor 110.

Figure 9:
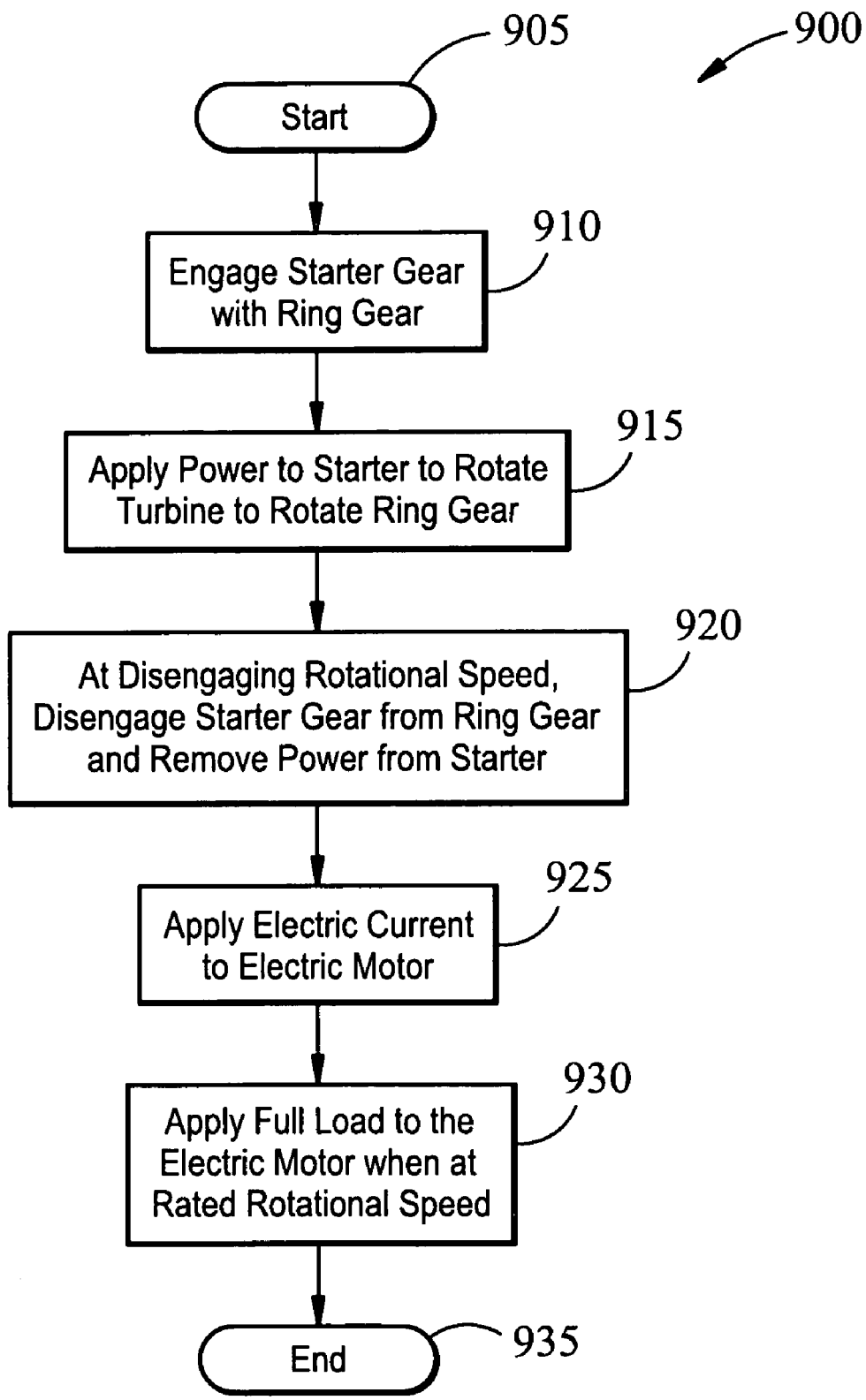
FIG. 9 contains a flow chart for a method of starting an electric motor according to an embodiment of the present invention.

FIG. 9 includes a flow chart 900 for the starting of an electric motor 210 according to an embodiment of the invention. A gear or starter gear 330 coupled to an air or gas engine starter 304 engages a gear or ring gear 306 coupled to an electric motor drive shaft 210 (Step 910). Power is furnished to the air or gas engine starter 304 so as to rotate the starter gear 330 (Step 915). When the electric motor shaft gear or ring gear 306 reaches a disengaging rotational speed, power is removed from the air or gas engine starter 304 and the starter gear 330 is disengaged from the electric motor shaft gear 306 (Step 920). Electric current is furnished to the electric motor 210 (Step 925). Full load is applied to the electric motor 210 when the rotational speed of the electric motor shaft gear 306 is the rated rotational speed (Step 930). In the case of an electric motor 210 coupled to a gas compressor 110, application of full load corresponds to feeding gas to the gas compressor 110. The disengaging rotational speed of the electric motor shaft gear 306 is less than the rated rotational speed.

Again referring to the description of the invention as shown in FIG. 3, the air or gas engine starter 304 is connected to an arrangement of two regulators. Regulator 1 350 has an operable connection to a switch 352 activated by a controller 350. Activation of the switch 352 connects pressurized gas to the air or gas engine starter 304 and serves to cause the starter gear 330 to engage the ring gear 306. Regulator 2 has an operable input gas from the air or gas engine starter 304 that is used to connect the pressurized gas to a turbine 720 within the air or gas engine starter 304 to cause the turbine 720 to start to rotate. The controller 360 also has input from a speed detector 362 that measures speed of rotation of the electric motor drive shaft 212, or, equivalently, the speed of rotation of the compressor drive shaft 214, the coupler 220, or the ring gear 306.

Still referring to FIG. 3, the compressor 110 also has inlet 240 and outlet 242 gas connections. The inlet connection 240 provides gas from an upstream end 106 of the pipeline 103 and the compressed gas outlet 242 provides input to the downstream end 107 of the pipeline 103, relative to the compressor 110. An electrical feed 370 from a utility supplies electrical power to the electric motor 210 through an electric power switch 380 under control of the controller 360.

Figure 10:
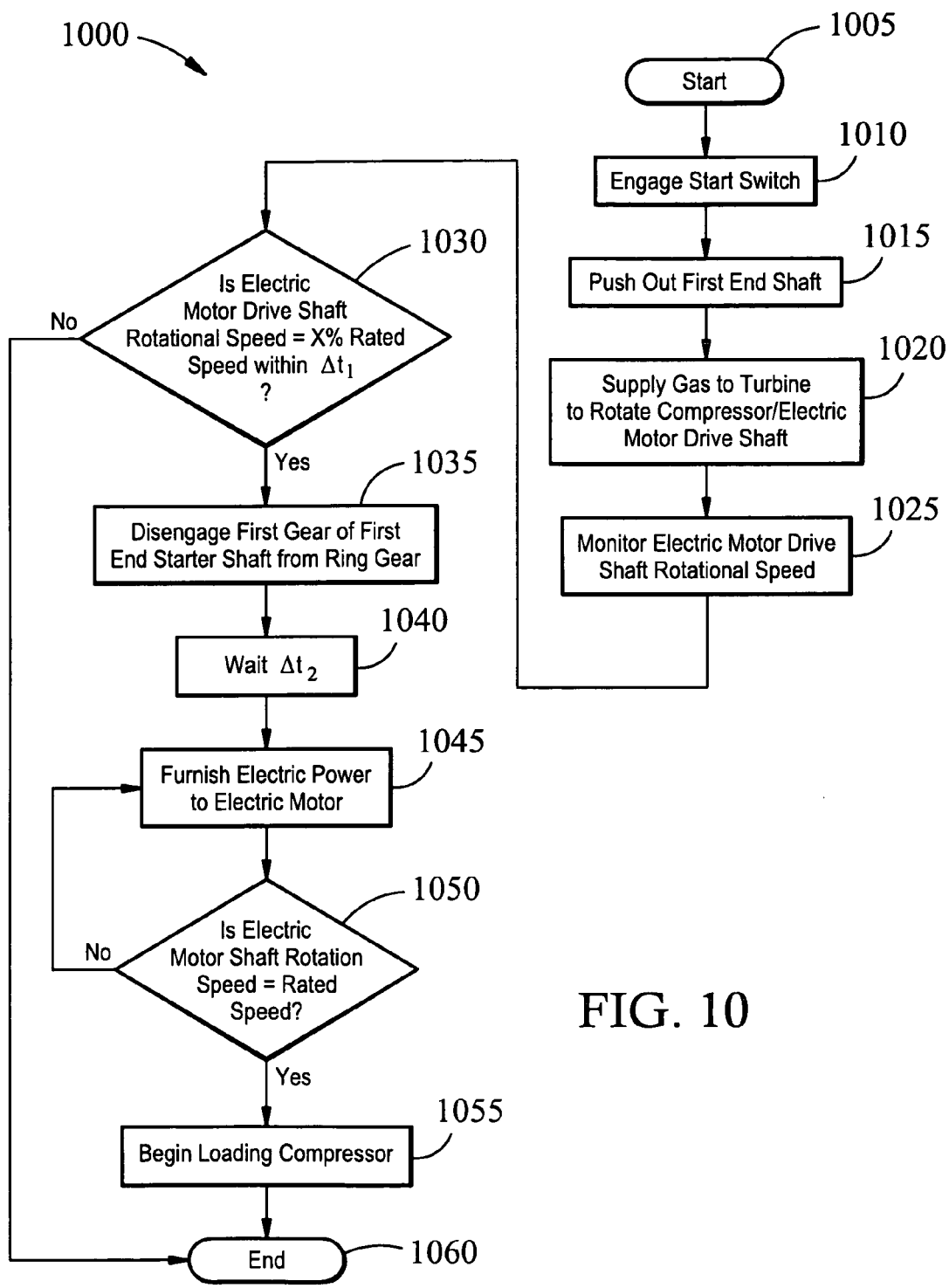
FIG. 10 contains a flow chart for a method of starting compression of natural gas according to an embodiment of the present invention.

FIG. 10 illustrates a flow chart 1000 of an embodiment of the invention for a method for using an air or gas engine starter 304 to start compression of natural gas. Engagement of a start switch 352 (Step 1010) causes the driving end shaft or driving shaft 706 to be pushed outward from the body or housing 730 of the air or gas engine starter 304 (Step 1015) and, as a consequence, to engage the ring gear 306. With engagement, compressed gas is supplied to the driven end 714 of the air or gas engine starter 304 to cause rotation of the turbine 720 (Step 1020). Rotation of the turbine 720 causes rotation of the driven shaft 714 and, consequently, rotation of the electric motor drive shaft 212 and the compressor drive shaft 214. As the rotation gains speed, the rotational speed of the electric motor drive shaft 210 is monitored by the speed detector 362 (Step 1025).

Again references made to the invention as shown in FIG. 3, wherein the controller 360 monitors whether the rotational rate of the electric motor drive shaft 212 has reached a certain percentage (X %) of its rated speed within a certain amount of time (Step 1030), where X is less than 100. If that period of time has passed without the electric motor drive shaft 212 having reached the required speed, the air or gas engine starter 304 is shut down. However, if the rated speed is reached within the prescribed time, the driving shaft 706 is disengaged from the ring gear 306 (Step 1035) and, after a second amount of time (Step 1040), electric power is provided to the electric motor 210 (Step 1045). The second amount of time is small to minimize the tendency of the compressor drive shaft 214 and the electric drive shaft 212 to slow down prior to electric power being furnished to the electric motor 210. Monitoring by the controller 360 continues as the rotational speed of the electric motor drive shaft 212 increases. Once the rotational speed of the electric motor drive shaft 212 reaches the rated rotational speed of the electric motor 210 (Step 1050), compressed gas is allowed to enter the compressor 110, and the compression process begins (Step 1055).

Figure 11:
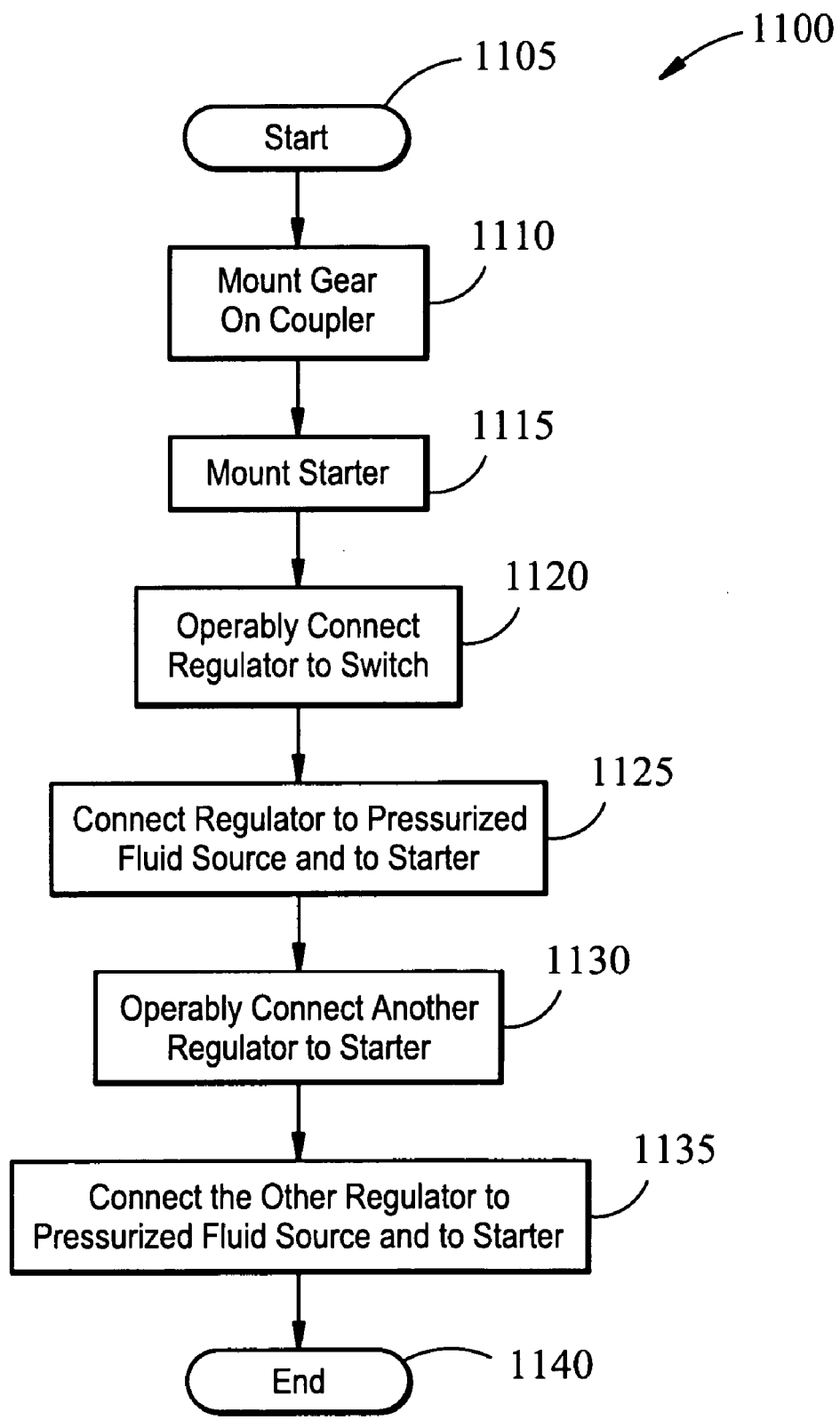
FIG. 11 contains a flow chart for a method of retrofitting an existing electric motor according to an embodiment of the present invention.

FIG. 11 illustrates a flow chart 1100 of a an embodiment of the invention for a method where the air or gas engine starter 304 may be mounted as a retrofit to existing electric motor-compressor combinations 105 whose efficiency may be improved with addition of an embodiment of the invention. Provision of a ring gear 306 in sections 402 allows an existing electric motor-compressor combination installation 105 to further include an embodiment of the invention. A retrofit operation includes mounting the gear or ring gear 306 on an existing coupler 220 or coupling, in some cases, replacing bolts 226 as necessary for longer versions (Step 1110). A bracket 326 and air or gas engine starter 304 may then be mounted on the platform or skid 202 oriented to allow engagement of the driving gear 330 of the driving shaft 706 with the gear or teeth 308 on the ring gear 306 (Step 1115).

Further, control of the air or gas engine starter 304 may be attained in a retrofit manner by operably connecting the regulator 350 to a switch 352 (Step 1120) and connecting the regulator inlet 354 to a source 374 of pressurized fluid at one end and a regulator outlet 355 to the air or gas engine starter 304 (Step 1125). In addition, another regulator 352 may be operably connected to the air or gas engine starter 304 (Step 1130) and connected to the pressurized fluid source 374 at its inlet 356 and to the air or gas engine starter 304 at its outlet 358 (Step 1135).

Figure 12:
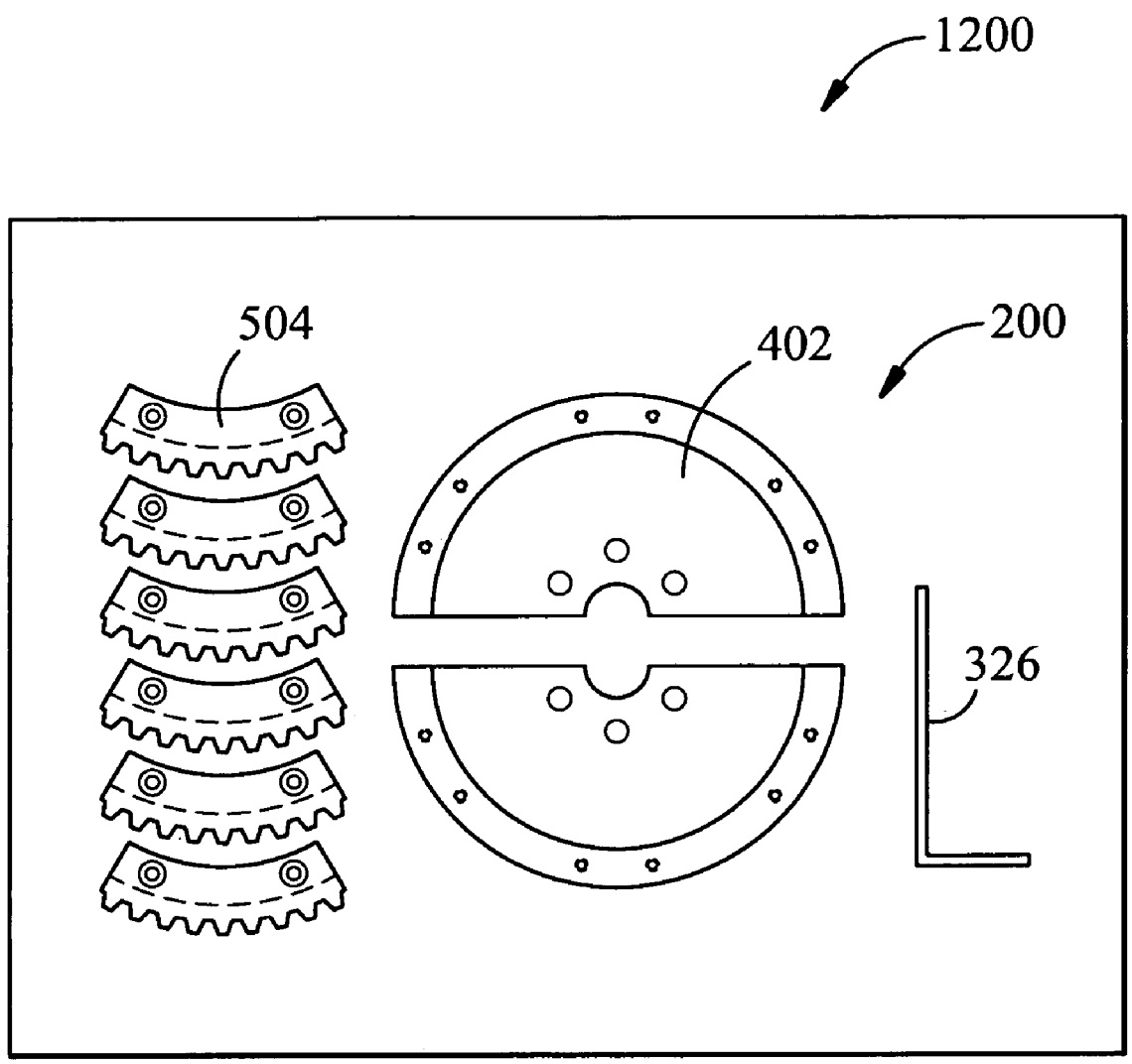
FIG. 12 is a schematic illustration of a retrofit kit for retrofitting an existing electric motor according to an embodiment of the present invention.

FIG. 12 illustrates a retrofit kit 1200 for retrofitting an existing electric motor 210 with an embodiment of the invention. The retrofit kit 1200 may include a coupler 220, having a gear 306 and an end 222 for coupling to the electric motor shaft 212, and an air or gas engine starter 304, for selective and disengagable coupling to the gear 306. The gear 306 may be integral with the coupler 220 and may include a flywheel 502 with teeth-like elements 308 at the periphery 506 of the flywheel 502. The flywheel 502 may also include one or more removable sections 504 with teeth-like elements 308 and a bracket 326 capable of coupling to the air or gas engine starter 304.

Embodiments of the invention benefit both operators of compressors and utilities.

1) With embodiments of the invention preventing the electric motor 210 from requiring from the utility during start up any peak or instantaneous load demands that exceed the full load operating current of the electric motor 210, the utility may provide the electricity required to operate the electric motor 210 at optimally reduced rates.

2) The utility may benefit from a constant base load consumption of electricity without peak load demands from such electric motors 210.

3) Operators may convert reciprocating engine-driven compressors to electric driven compressors 110 and receive lower cost electricity.

4) When operating a compressor 110 on an electric motor 210, compression station operators may increase profitability by selling the available natural gas not burnt as fuel to run the natural gas reciprocating engine.

5) Many gas compression stations cannot increase capacity (throughput) by adding more gas compressor units 110 due to emission emitted by the current engines installed at the site. Embodiments of the invention may allow increased compression capacity at any such site by exchanging reciprocating engine driven compressors with electric motor-driven compressors 110 utilizing the additional startup torque provided by the embodiments.

6) Embodiments of the invention may incorporate one or more air or gas engine starters 304 to drive the gas compressor 110 during startup. In particular, an air or gas engine starter 304 may drive a serrated ring gear 306, which may be fitted to the standard torsional coupling 220 typically used to couple an electric motor 210 to a gas compressor 110. The embodiments of the invention may be incorporated in a newly assembled electric motor-driven gas compressor 110; a retrofit kit into a pre-existing electric motor-driven gas compressor 110; or in the form of a kit along with the supply of an electric motor to replace an existing reciprocating engine driving a gas compressor 110.

Having thus described at least one illustrative embodiment of the invention, various alterations, modifications and improvements will readily occur to those skilled in the art. Such alterations, modifications, and improvements are intended to be within the scope and spirit of the invention. Accordingly, the foregoing description is by way of example only and is not intended as limiting.

What is claimed is:

1. A method for limiting start-up current drawn by an electric motor used for moving pressurized fluid through a supply conduit, the method comprising:
   a) providing the electric motor capable of drawing a full load current from a current source when a mechanical load is operably coupled to a shaft of the electric motor while the shaft is rotating at a rated rotational speed;
   b) providing a plurality of starters disengagably coupled to the shaft of the electric motor to rotate the electric motor shaft;
   c) supplying the pressurized fluid from the supply conduit to the plurality of starters to cause the starters to rotate the electric motor shaft, one of said plurality of starters having a gear ratio different than at least one other of the plurality of starters; and
   d) selectively disengaging the plurality of starters from the electric motor shaft upon substantially reaching said rated rotational speed; and wherein, upon furnishing electric current to the electric motor, a rate of current drawn by the electric motor from the current source will not substantially exceed the full load current.

2. The method of claim 1, wherein said mechanical load comprises a compressor having a compressor shaft coupled to the shaft of the electric motor.

3. The method of claim 1, wherein the pressurized fluid is a compressed gas.

4. The method of claim 1, wherein the pressurized fluid is compressed natural gas.

* * * * *